(12) United States Patent
Linnartz (10) Patent No.: US 8,260,137 B2
(45) Date of Patent: Sep. 4, 2012

(54) RECEIVER FOR A MODULATED LIGHT SIGNAL AND METHOD FOR RECEIVING A MODULATED LIGHT SIGNAL

(75) Inventor: Johan Paul Marie Gerard Linnartz, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 601 days.

(21) Appl. No.: 12/513,181

(22) PCT Filed: Oct. 29, 2007

(86) PCT No.: PCT/IB2007/054381
§ 371 (c)(1),
(2), (4) Date: May 1, 2009

(87) PCT Pub. No.: WO2008/053422
PCT Pub. Date: May 8, 2008

(65) Prior Publication Data
US 2010/0074620 A1    Mar. 25, 2010

(30) Foreign Application Priority Data
Nov. 3, 2006 (EP) ..................... 06123419

(51) Int. Cl.
*H04J 13/00* (2006.01)
*H04B 10/00* (2006.01)
*H04B 10/06* (2006.01)
(52) U.S. Cl. ............ 398/77; 398/172; 398/202; 398/208
(58) Field of Classification Search ............... 398/77, 398/172, 202, 208
See application file for complete search history.

(56) References Cited

U.S. PATENT DOCUMENTS

| | | | |
|---|---|---|---|
| 5,166,952 A | 11/1992 | Omura et al. | |
| 5,410,147 A * | 4/1995 | Riza et al. | 250/214 LS |
| 5,432,813 A | 7/1995 | Barham et al. | |
| 5,666,379 A | 9/1997 | Ovard et al. | |
| 6,067,180 A * | 5/2000 | Roberts | 398/201 |
| 6,542,270 B2 | 4/2003 | Perkins et al. | |
| 6,628,699 B2 | 9/2003 | Ramberg et al. | |
| 6,952,565 B1 * | 10/2005 | Takeda et al. | 455/84 |
| 2002/0163696 A1 | 11/2002 | Huang et al. | |
| 2004/0208537 A1 * | 10/2004 | Lee et al. | 398/41 |

* cited by examiner

*Primary Examiner* — Tod T Van Roy
*Assistant Examiner* — Michael Carter
(74) *Attorney, Agent, or Firm* — Kenneth F. Kozik; Mark L. Beloborodov (57) ABSTRACT

The invention relates to receiving of a modulated light signal from a lighting device, particularly from a solid state lighting (SSL) device. It is an object of the present invention to provide a receiver and a receiving method which are primarily designed to operate efficiently for light (wave) signals that adhere to specific constraints. In order to achieve this object, the invention provides a receiver for a modulated light signal which is keyed with a code sequence of a predefined number of chips, comprising —a light sensor adapted to receive the modulated light signal and to convert it into an electrical signal, —sampling means adapted to take several consecutive samples of the electrical signal during a chip period, and —processing means adapted for calculating for each sample of a chip period an inner product with the chip.

18 Claims, 4 Drawing Sheets

RECEIVER FOR A MODULATED LIGHT SIGNAL AND METHOD FOR RECEIVING A MODULATED LIGHT SIGNAL

The invention relates to receiving of a modulated light signal from a lighting device, particularly from a solid state lighting (SSL) device.

U.S. Pat. No. 6,542,270 B2 discloses a modulation scheme for optical communications. A signal to be transmitted is multiplied by a pseudo-random noise (PN) code, thus, generating a coded or modulated light signal. A receiver converts the modulated light signal and correlates the converted signal with the PN code in order to decode the signal. A suitable light source for this kind of signal transmission is a Solid State Lighting (SSL) device, such as a LED (light emitting diode) and laser diode. Since many illumination LEDs can be modulated at rates around 1 . . . 10 MHz, it is possible to transmit information with a high transmission rate via these LEDs. According to U.S. Pat. No. 6,542,270 B2, a light signal may be coded with a unique PN (Pseudo Noise) code for transmission. This allows to transmit several light signals which were coded with different PN codes at the same time, similar to CDMA (Code division Multiple Access) wireless communication systems.

A commonly known receiver for CDMA coded radio signals is the rake receiver which decodes the received signals using the unique PN codes. Basically the rake receiver correlates an incoming CDMA signal with a reference copy of the expected incoming waveform. Since in a wireless communication system, the incoming signal is exposed to a dispersive channel that spreads the waveform over time, the receiver correlates not only the direct incoming signal but also appropriately time-shifted versions of this signal with a reference copy of the code sequence used by the transmitter. The incoming signal may be either delayed with delay elements in order to obtain several time shifted versions of the signal corresponding to different dispersive transmission channels, or it may be correlated with delayed copies of the code sequences. These two variants of the rake receiver are mathematically equivalent.

It is an object of the present invention to provide a receiver and a receiving method which are primarily designed to operate efficiently for light (wave) signals that adhere to specific constraints.

In order to achieve the object defined above, the invention provides a receiver for a modulated light signal which is keyed with a code sequence of a predefined number of chips, comprising a light sensor adapted to receive the modulated light signal and to convert it into an electrical signal, sampling means adapted to take samples of the electrical signal during a number of chip periods, and processing means adapted for calculating an inner product with the code sequence by using a sequence that contains one sample from each of a chip period.

In order to achieve the object defined above, the invention provides a method for receiving a modulated light signal which is keyed with a code sequence of a predefined number of chips, wherein the method comprises the steps of:

receiving the modulated light signal and converting it into an electrical signal, taking several consecutive samples of the electrical signal during a number of chip periods, and calculating an inner product with the code sequence by using a sequence that contains one sample from each of a chip period.

According to the invention, an inner product of two vectors, each of a length related to the code size, is calculated. The first vector comprises samples from different (preferably consecutive) chip periods, such that each chip contributes one value in the vector. The second vector is a reference copy of the code sequence.

The characteristic features according to the invention provide the advantage that modulated light signals which were keyed with a code sequence of a predefined number of chips may efficiently be received despite the characteristic constraints for a light wave communication such as highly dispersive transmission channels or where the light source has a slow response function. In particular, each chip satisfies besides its communication function, also an illumination requirement. Moreover, the invention is suitable for a system in which the signal waveforms of the emitted light are constrained by illumination requirements, such as duty cycle that is prescribed by the desired illumination intensity. The invention is particularly useful if the light modulation methods involves a (repetitive) pattern of chips, each with subperiods used for communication and subperiods used for adaptive illumination. Usually there is also a limitation on the number of on-off transitions per second for a LED as light source. Frequent on-off switching is not favorable, because substantial amounts of energy are lost during every switch. Therefore (chip-) waveforms can be chosen that have relatively long duration and where the duty cycle is mainly determined by the illumination constraints, while the data has neglible influence on the (average) duty cycle. Also, (chip-)waveforms may be chosen where the duty cycle of the pulse is not determined by the data to be communication, and where the data pulse is concatenated to the illumination pulse, within the same chip period. That is, the modulated information is located at specific periodic positions, namely at the pulse start and pulse end. However, also the invention is also suitable with (chip-) waveforms where the illumination pulse and data pulses are separated, i.e. a chip comprises an illumination pulse and a further data pulse. It should be noted that the invention is not restricted to a specific chip-waveform but is suitable for detecting light signals with different waverforms as the before mentioned. In contrast to the transmission of data with light, the notion of a chip in CDMA radio communication is typically considered to be a short pulse during which a single element of the code sequence is transmitted. The invention extends this concept such that each chip can contain not only a (data) period during which a part of the code sequence is transmitted, but also an illumination period during which the light is for a fraction of the time and off for another fraction, depending on the required light intensity. The invention (and its step of taking a subset of samples) is particularly suitable to receive or detect such light signals. The inventive receiver is particularly suitable for such (chip) waveforms. Furthermore, the invention is particularly useful for the situation of many light sources, for example LEDs, that simultaneously transmit data which is for example the case in a complex lighting system with dozens of light sources. The signals from the different light sources may be separated with the invention, to detect the data or to estimate the parameters of light wave channels. In particular, the inventive receiver can separate signals from different light sources by using a different subset of samples in each chip or by applying an inner product with a different, or a combination of these.

A further extension of the invention involves the use of multiple instantiations (branches' or 'fingers') of calculating said inner product, where different branches uses different subsets of the samples from each chip. Different branches can be designed for detecting signals from different users/light sources.

According to an embodiment of invention, the processing means may be adapted to calculate several inner products with the code sequence by using several sequences that contain different samples from each of a chip period, and the receiver may further comprise combining means adapted to combine the results of the inner product calculations and to output a decision signal as a result of the combination.

The processing means of the receiver may comprise according to an embodiment of the invention:

a number of inner product calculators each being adapted for calculating an inner product with the code sequence by using a sequence that contains one sample from each of a chip period, and switching means adapted to send different samples from a chip period to different inner product calculators. An inner product calculator may comprise for example a correlator. Furthermore, an inner product calculator may be adapted to multiply a received sample with a value corresponding to the associated chip, i.e. with a sample from a reference copy of the code sequence which may either be a direct sample or a composite sample processed by a prefilter applied to received light signals which were oversampled in order to remove irrelevant frequency components from the light signal by combining a few samples, and may comprise an accumulator for accumulating and storing multiplication results.

According to a further embodiment of the invention, the processing means of the receiver may be adapted to:

collect all samples to be used for an inner product calculation in a serial-to-parallel buffer in order to form an inner product vector, and execute a matrix operation on the inner product vector.

The matrix operation may be a Walsh Hadamard operation on the inner product vector. Particularly, the matrix operation may have a butterfly structure for an efficient implementation. This particularly useful if signals from multiple light sources with different codes need to be extracted.

The processing means may be implemented according to an embodiment of the inventive receiver by a digital signal processor which is adapted to:

sequentially store all samples in a memory, and use the stored samples per further inner product calculation in groups representing subsampling.

The code sequence may comprise N2 chips and the sampling means may be adapted to take N1 samples per chip period. According to an embodiment of the invention, the processing means may be further adapted to:

store N1 groups of N2 samples with the same sampling position in a chip period in N1 columns of the memory in order to form inner product vectors for each sampling position, and multiply each inner product vector with a matrix containing in each row a code sequence.

Alternatively, the processing means may be adapted to:

store N1 groups of N2 samples with the same sampling position in a chip period in N1 columns of the memory in order to form inner product vectors for each sampling position, and to use each of the N1 inner product vectors as input for a Walsh Hadamard matrix operation of size N2×N2.

According to an embodiment of the inventive receiver, the result of an inner product calculation may be weighted with an weight factor thus allowing to suppress and emphasize certain results of inner product calculations, for example to emphasize the results of inner product calculation of samples taken from an edge of a pulse of the electrical signal and to suppress the results of inner product calculations of samples taken during a high or low phase of a pulse of the electrical signal.

According to a further embodiment of the inventive receiver, the processing means may be adapted to the j-th inner product dj according to the following equation:

$$dj = \sum_{n=0}^{N2-1} (2C[n] - A)(Y[j + nN1] - B)$$

with j=1, ..., N1. Here the constants A and B are intended to remove a DC term in the outcome. In the case that C[n] takes values 0 and 1 with equal probability, an effective choice is A=1 and B=0.

According to a further embodiment of the inventive receiver, 2 k results of the inner product calculations may be received for further processing wherein a first set of k results correspond to sampling positions in chip period between an on ramp of a "0" pulse and an on ramp of a "1" pulse, and a second set of k results different from the k results of the first set correspond to sampling positions in the chip period between an off ramp of a "0" pulse and an off ramp of a "1" pulse.

This allows to separate the pulses of different light signals which were received by the sensor and converted into an electrical signal.

According to an embodiment of the invention, the method for receiving a modulated light signal which is keyed with a code sequence of a predefined number of chips may comprise the steps of:

calculating several inner products with the code sequence by using several sequences that contain different samples from each of a chip period, and combining the results of the inner product calculations and outputting a decision signal as a result of the combination.

The method may be characterized according to a further embodiment of the invention in that the inner product calculation comprises the steps of multiplying a received sample with a value corresponding to the associated chip and accumulating and storing the multiplication results. The inner product calculation may alternatively comprise the steps of collecting all samples for an inner product calculation and forming an inner product vector, and executing a matrix operation on the inner product vector, wherein the matrix operation may be a Walsh Hadamard operation on the inner product vector and particularly may have a butterfly structure.

According to an alternative embodiment of the invention, the method may also comprise an inner product calculation which comprises the steps of sequentially storing all samples, and using the stored samples per further inner product calculation in groups representing subsampling.

The code sequence may comprise N2 chips and the sampling means may be adapted to take N1 samples per chip period. According to an embodiment of the invention, the inner product calculation comprises the step of:

storing N1 groups of N2 samples with the same sampling position in a chip period in order to form inner product vectors for each sampling position, and multiplying each inner product vector with a matrix containing in each row a code sequence.

According to an alternative embodiment of the invention, the inner product calculation comprises the step of storing N1 groups of N2 samples with the same sampling position in a chip period in order to form inner product vectors for each sampling position, and using each of the N1 inner product vectors as input for a Walsh Hadamard matrix operation of size N2×N2.

The method may further comprise the step of weighting the result of an inner product calculation with a weight factor.

According to an embodiment of the invention, the j-th inner product dj is calculated according to the following equation:

$$dj = \sum_{n=0}^{N2-1} (2C[n]-1)(Y[j+nN1])$$

with j=1, ..., N1.

Finally, the method may further comprise the step of receiving 2 k results of the inner product calculations for further processing wherein a first set of k results correspond to sampling positions in chip period between an on ramp of a "0" pulse and an on ramp of a "1" pulse, and a second set of k results different from the k results of the first set correspond to sampling positions in the chip period between an off ramp of a "0" pulse and an off ramp of a "1" pulse.

According to a further embodiment of the invention, a computer program is provided, wherein the computer program may be enabled to carry out the method according to the invention when executed by a computer. For example, the computer program may generate the control signal digitally, and the generated control signal may then be output over an interface of a computer to a lighting device such as a LED or to a certain LED of a lighting board.

According to an embodiment of the invention, a record carrier such as a CD-ROM, DVD, memory card, floppy disk or similar storage medium may be provided for storing the computer program according to the invention.

A further embodiment of the invention provides a computer which may be programmed to perform a method according to the invention and may comprise:

a sensor for receiving modulated light signal which is keyed with a code sequence of a predefined number of chips and converting the received light signal into an electrical signal, and sampling means for taking a subset of the samples of the electrical signal during a number of chip periods for further processing with the computer.

According to a further embodiment of the invention, the function of light sensing and receiver processing may be separated in different devices. In particular, a handheld device may contain a light sensor and a communication means, for instance a radio transmitter to send the light measurements to a central computer. The computer may be programmed to perform a method according to the invention and may comprise a means for taking several subsets of samples of the electrical signal during a sequence of chip period for further processing, including the calculation of inner products.

According to a further embodiment of the invention, an illumination sensing device is provided which comprises a receiver according to the invention. The illumination device may comprise according to an embodiment of the invention communication means adapted to transmit the results of the inner product calculations to a lighting infrastructure for combining the results of the inner product calculations and generating a decision signal as a result of the combination for controlling settings of light sources of the lighting infrastructure.

These and other aspects of the invention will be apparent from and elucidated with reference to the embodiment(s) described hereinafter.

The invention will be described in more detail hereinafter with reference to exemplary embodiments. However, the invention is not limited to these exemplary embodiments.

In the following, the invention is described by means of embodiments with LEDs as lighting means although this may not be understood as restrictive to the invention. For communication with LEDs, frequent on-off switching is not favorable, because substantial amounts of energy are lost during every switch. Therefore typically waveforms are chosen that have relatively long duration and where the duty cycle of the pulse is not determined by the data to be communication. The modulated information is located at specific periodic positions, namely at the pulse start and pulse end of an emitted light pulse.

Figure 1:
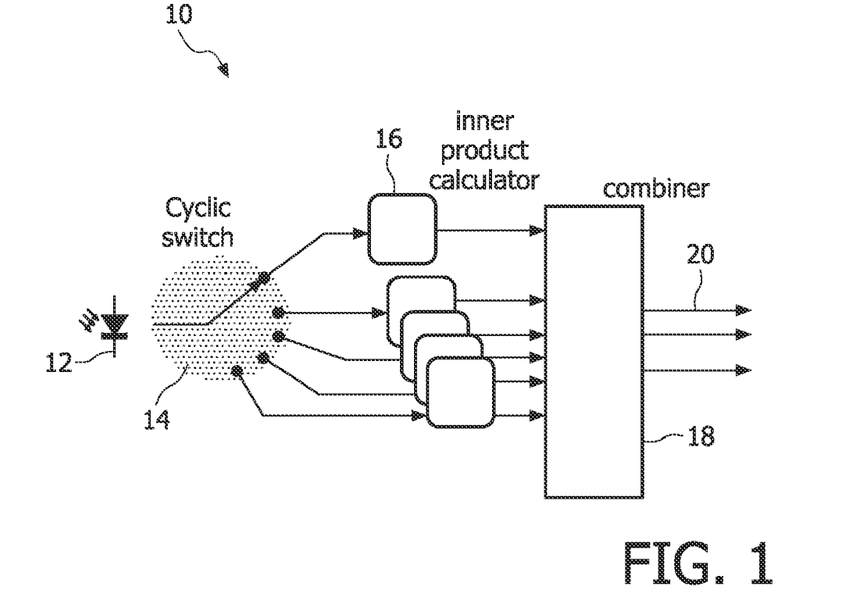
FIG. 1 shows a block diagram of an embodiment of a receiver for several differently coded light signals according to the invention.

FIG. 1 shows a receiver 10 for receiving several modulated light signals and to decode the different light signals. The receiver 10 contains a sensor 12, e.g. a photodiode, a phototransistor or other light sensitive material, for converting the received light signals into an electrical signal, cyclic switching means 14 to sample the electrical signal and to cyclically send samples of the electrical signal to multiple calculators 16 of an inner product of a sample with a chip of the code sequence used for modulating a light signal, and a combiner 18 to combine signals from the outputs of the inner product calculators 16, and several outputs 20 for detected light signals. The inner product calculators 16 are correlators adapted for correlating a received sample with a certain chip of the code.

The receiver works as follows: a received light signal, for example a CDMA (Code Division Multiple Access) light signal, is converted into an electrical signal by means of the sensor 12. A sampler of the cyclic switching means 14 the takes samples of the electrical signal. For each sample taken from a chip, a contribution to the correlation value 16 is calculated. Thus, each sample is send to an associated correlator 16 from the cyclic switching means. Thus, each one of the correlators 16 receives a different sample from a chip of the code sequence used for modulating the light signal. Each correlator 16 multiplies (in 54) the received chip sample with a reference copy of the respective chip and accumulates the result 56. Therefore a correlator receives not only a sample of the first chip of a code sequence, but also samples of all other chips. It is important to understand that each of the correlators 16 observes the presence of the code a specific time offset from the start of the chip periods. The code can be present at different time shifts simultaneously because of the nature of the modulation. In other word, each of the correlators 16 receives a time-shifted sample of the code sequence, so that no correlator receives timely synchronized samples of the code sequences. Moreover, since each correlator 16 represents a kind of channel with a specific delay within the entire transmission channel of the light signal. Due to dispersion in the light transmission channel the position of the pulses upon receipt differs more or less from the pulse position at transmission. The receiver can aggregate the energy from all modulated fractions of the chip, or from all delayed and time-dispersed received signal components.

Next, the functionality of a correlator is explained in more detail. For a receiver that only looks for the signal of a specific source, a correlator 16 typically calculates the inner product of the sub-sampled sensor signal with a code sequence which was used to modulate the light signal for transmission. This inner product is calculated as the addition of a number of samples. Each sample is first multiplied by factor, where the factor corresponds to the value of the code sequence. Mathematically the j-th inner product can be calculated as follows $$dj = \sum_{n=0}^{N2-1} (2C[n]-1)(Y[j+nN1])$$

Here Y(i) is the i-th sample of the incoming signal, and C[ ] is the code sequence of length N2. N1 is an integer strictly larger than 1, j=1, 2, . . . N1. In contrast to a conventional rake receiver, each correlator 16 is using a disjoint set of samples, and each sample only goes into one associated correlator 16.

The code sequence is used in a correlator 16 after a scaling to by 2C[n]+1, which is in this case used to remove a possible DC component in C[n]. The combiner 18 uses as input the outputs of a number of correlators 16, and calculates a decision variable. The decision variable is used to estimate the value of the user bit that was transmitted with the light signal. In some applications, the decision variable is rather used to estimate the strength of the light signal from the source, while there may not even be user data to modulate the signal.

Figure 2:
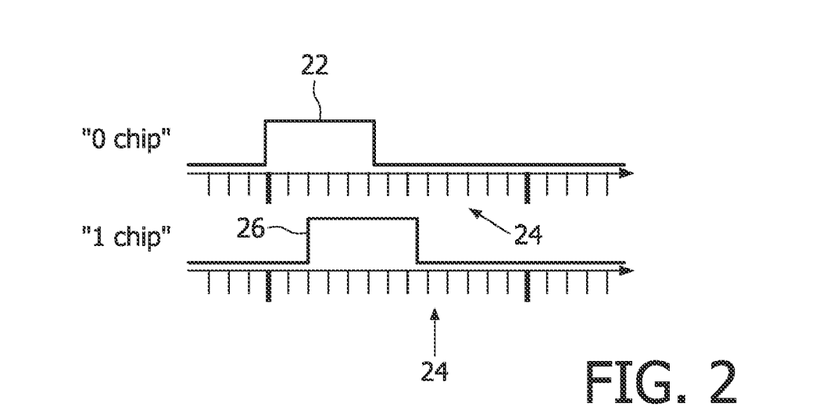
FIG. 2 shows an example of two different chips of a code sequence with the time points for taking samples during the period of a chip according to the invention, wherein the two chips are modulated according to PPM.
Figure 3:
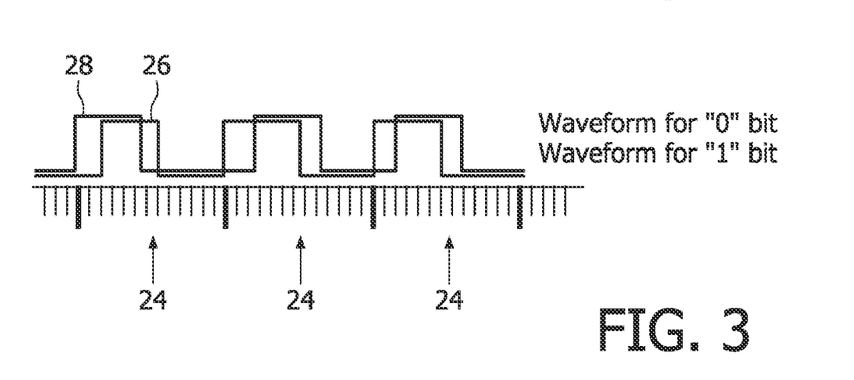
FIG. 3 shows an example of two different code sequences of three chips modulated with PPM, wherein one sequence comprising the chip sequence "011" codes a "0" bit and the other sequence comprising the chip sequence "100" codes a "1" bit.

The operation of the receiver is now explained in more detail with regard to FIGS. 2 and 3. In the following explanation, a receiver for a CDMA light signal that consists of PPM chip pulses is addressed. Each PPM pulse is one chip of the CDMA signal, as shown in FIG. 2, where the horizontal axis represents time and the vertical axis represents light intensity. The "0 chip" 22 is a PPM pulse which starts at the beginning of a chip period 24. The "1 chip" 26 starts later in the time frame, as shown in the diagram below in FIG. 2. Multiple chips form a code sequence as shown in FIG. 3. Here the code sequence for a user bit "1" is "100" (reference numeral 26 in FIG. 3) and the length of the code sequence is N2=3. For a user bit "0" the chip sequence "011" (reference numeral 28 in FIG. 3) is transmitted.

Figure 4:
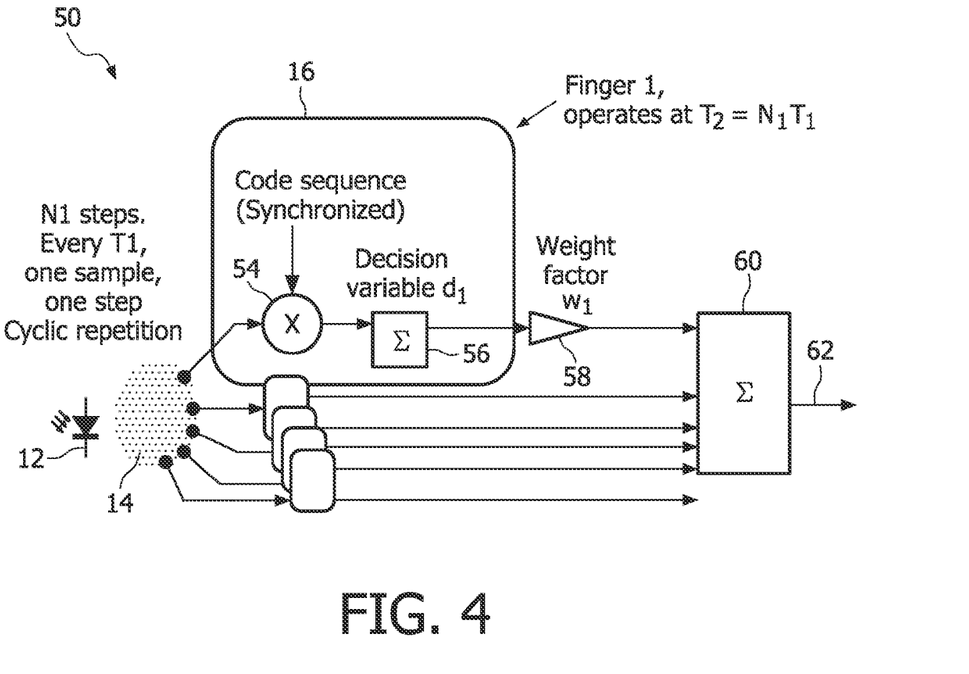
FIG. 4 shows a block diagram of an embodiment of a receiver for one coded light signal according to the invention.

FIG. 4 shows a receiver 50 for receiving and decoding one specific light signal. In FIG. 4, the same reference numerals as in FIG. 1 are used for (functional) identical elements. The receiver 50 samples the electrical signal generated from an incoming light signal at a sampling rate much higher than the chip duration, namely high enough to resolve the differences in the different positions of a "0" and "1" chip. In FIGS. 2 and 3, the smaller markers on the time axis correspond to sampling periods. Every chip period consists of N1=13 such samples. Chip periods 24 run between two larger markers. The cyclic switching means 14 send the first sample of every chip period 24, i.e., every sample 1+j N1 to a first one of a number of correlators 52, j is an arbitrary integer. The cyclic switching means 14 send every second sample and of the chip period 24, i.e., every sample 2+j N1 to a second one of the correlators 16, and so on, until the N1-th one of the correlators 16.

Each one of the correlators 16 takes the incoming sample and multiplies it with a value corresponding to the next entry out of a reference copy of the code "011". If the entry is "1", it multiplies by 1, if the entry is "0", it multiplies by −1. The result is added to the value that is stored in an accumulator 56 (or "summer"). Each accumulator 56 is reset to zero at the beginning over every period of N1 times N2 samples, thus before each code starts to be transmitted. At the end of the period there is the sum of N2 samples accumulated in each one of the correlators 52. The outputs of the correlators 52 are combined, e.g. added up with a weight factor 58. This weight factor depends on the position of the PPM pulse in the chip period. In this example, the outputs of the first and second correlators are weighted with w1=w2=+1, respectively, because the receive samples of the modulated light signal up ramp of the PPM pulse, while the outputs of seventh and eight correlators are weighted with w7=w8=−1, as these see the downramp of the PPM pulse (refer to FIG. 2), hence an inverted signal. The weight factors of other correlators, for example of the fourth correlator, w4, can be set to zero. By combining the output signals of the first, second, seventh, and eighth correlators, the receiver gathers (as by a garden "rake") the appropriate energy from the communication signal. A decision on the user bit can then be based on the resulting signal. If it is positive, a "1" was presumably transmitted. If it is negative, a "0" was presumably transmitted.

Several extension are possible of the receiver are possible:

The receiver can be designed to simultaneously detect the signals of multiple sources, i.e., several light signal modulated with different code sequences. The different light signals can be distinguished by various parameters, particularly the position of the pulse in the chip period, and on the choice of the code.

It is also possible that the sources of the light signals all use the same code, but different positions of the "0" and "1" chip. Positions here mean a position within a chip period as shown in FIGS. 2 and 3 by the smaller markers. The position number means the location of the position in the chip period, e.g. position 1 means the first position, i.e., the first marker in the chip period. For instance the "1" chip pulse may cover position 4, 5, 6, 7, 8, 9, 10, 11, 12, while the "0" chip covers position 7, 8, 9, 10, 11, 12, 13, 14, 15. So its signal will be seen in a disjoint different set of correlators. The combiner can use these different correlators, namely the one provided for the positions 4, 5, 6 and 13, 14, 15 to extract the signal. A suitable two-source receiver has a common photodiode, common cyclic switching means and correlators for positions 1, 2, 4, 5, 6, 7, 8, 13, 14, 15 and a combiner with 10 inputs and two outputs.

A special case occurs if a first light source uses the positions as used in the example for a single user and second light sources use a partially overlapping set of modulated positions. Say the "1" chip pulse covers position 6, 7, 8, 9, 10, 11, while the "0" chip covers position 8, 9, 10, 11, 12, 13. The combiner may ignore the output of the seventh correlator because it contains values from two different light sources. Alternatively one can recognize the correlator outputs for a system of linear equations with the user data and the noise as unknowns. If light signal 1 is denoted as S1 and light signal 2 as S2, then
correlator output 1=signal 1+noise 1
correlator output 2=signal 1+noise 2
correlator output 6=−signal 2+noise 6
correlator output 7=−signal 1+signal 2+noise 7
correlator output 8=−signal 1+noise 8
correlator output 12=−signal 2+noise 12
correlator output 13=−signal 2+noise 13
The numbers denote the sample positions within a chip period. The correlator can then calculate the estimates for signal 1 and signal 2 based on the Minimum Mean Square Error criterion. In practice, this will result in specific optimal linear weight factors to estimate S1 and S2 from the outputs of the correlators 1, 2, 6, 7, 8, 12 and 13.

If on the other hand, the light sources use different codes, the correlation operation must find the inner product with each of the codes used. Efficient implementations can be taken for special cases, such as when the codes are cyclic shifts of each other, or when the codes are structures according to a Walsh Hadamard matrix.

A possibility is to collect all N2 values that go it each per inner-product calculator in a serial-to-parallel buffer, and to execute a matrix operation on this vector. A useful example is that the matrix operation is a Walsh Hadamard (WH) operation on this vector, where the efficient butterfly implementation of the WH operation may be exploited. As will be explained later, in such case, out of the N2 outputs of the operation, the output values 2, . . . N2 reflect the possible signal contributions from N2−1 different users, and the first value reflects the average illumination strength, including the contributions from environmental light and from other light sources, namely those that happen to have an illumination period during the time shift that corresponds to that finger.

Figure 5:
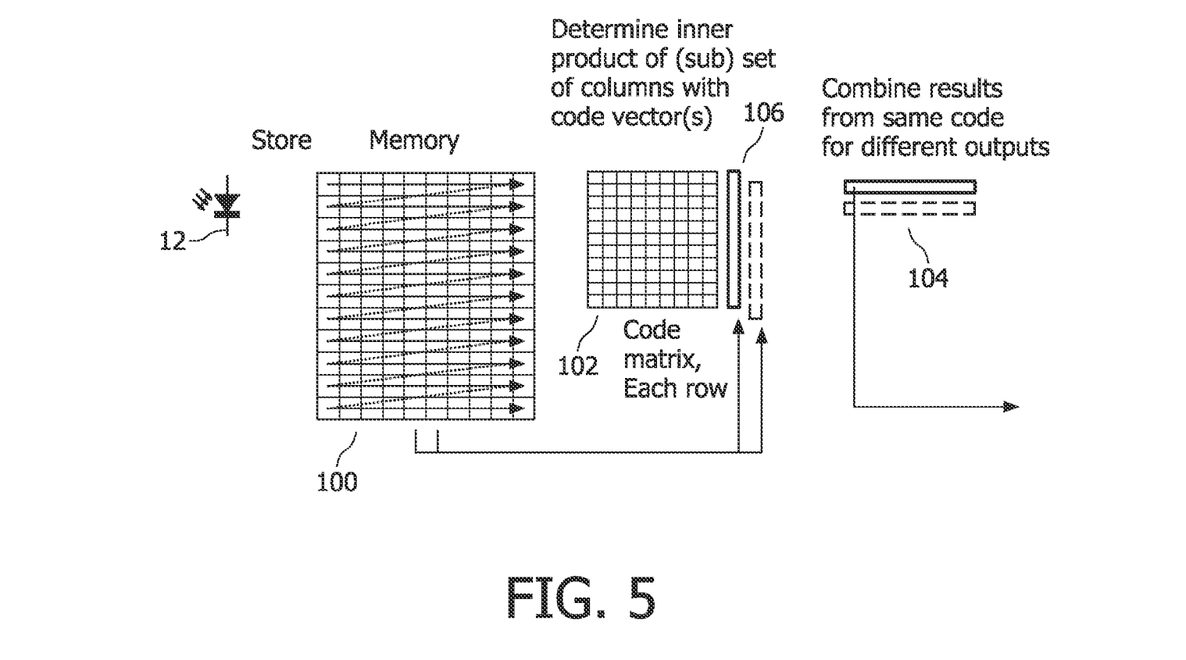
FIG. 5 shows a block diagram of an embodiment of a receiver comprising a matrix operation for processing a received coded light signal according to the invention.

FIG. 5 shows an embodiment which refers to a typical implementation on a Digital Signal Processor, with a data memory. The signal processing operations are executed on the DSP according to the scheme shown in FIG. 5. The memory 100 is drawn in a manner that it resembles the structure of an interleaver. It reflects that samples are written into the memory sequentially, but samples are used per further inner product calculation in groups that represent a subsampling.

In a full multi-signal receiver, all columns are used to determine the inner product with code vectors. Examples of calculating this inner product are as follows:
1. all entries of the vector are multiplied with a value that corresponds to value of the code.
2. Each of the N1 columns is used as input for a Walsh Hadamard matrix operation (of size N2 by N2) which can be implemented efficiently using a butterfly structure. It results in N1 output vectors of length N2 each.

The cyclic switching means and the outputs of the calculators for the inner products may be implemented in one (portable) device, that also has a cable or wireless means to communicate with another device, which may be for example a part of a controller in an illumination infrastructure. The outputs of the calculators are sent from the (portable) device to the other device, e.g. the lighting controller which may then combine the outputs in order to decide which signal has been received.

The inventive receiver works is also suitable to receive light signals which were modulated with an ON-OFF keying (OOK) scheme since the data is carried by switching a part of the pulse for controlling a LED on or off depending on the data to be carried. In the following, the receiving of a light signal modulated with OOK and the determination of a decision signal or bit after combination of the results of the inner product calculations is explained in detail.

Figure 6:
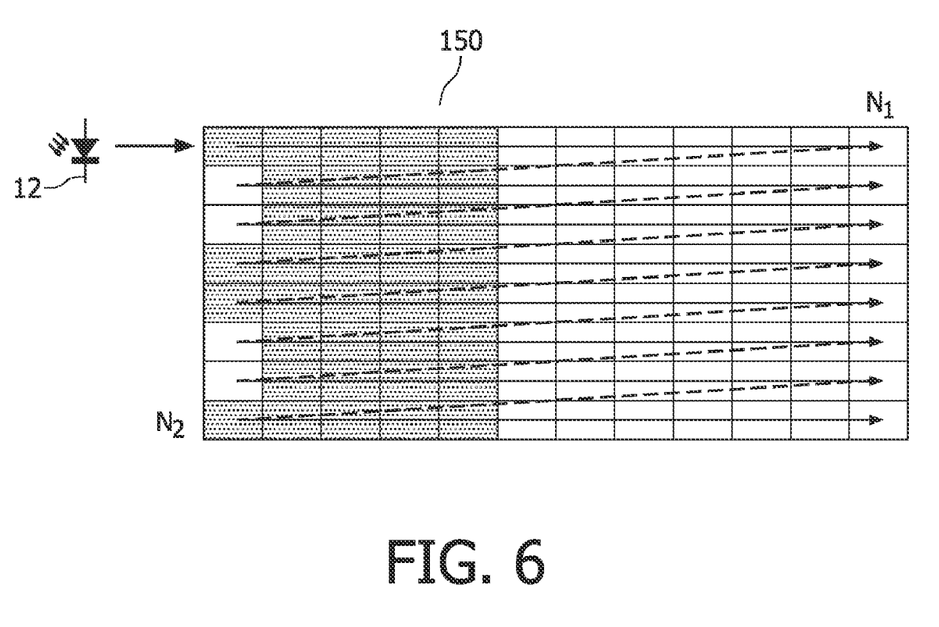
FIG. 6 shows a simplified data structure in a rake receiver for OOK based codes according to the invention.

The sampled received signal $y(nT_1)$ of a photodiode detecting a light signal modulated according to OOK may be fed at the input of a memory of size $N_3=N_1 N_2$. This memory may be filled row by row, such that $N_1$ samples fill each row. After $N_2$ rows are filled, the memory is fully occupied with the pulses of a full symbol. FIG. 6 shows a data structure 150 used in a receiver 200 (FIG. 7) adapted for OOK based codes. This data structure may be regarded as a visualization of the structure of the memory used to store the samples as described above. The individual pulses of the LED and its OOK coded prefixes are shown as shaded areas of the data structure (system with $N_1=12$, $N_2=8$, C=01100110).

Figure 7:
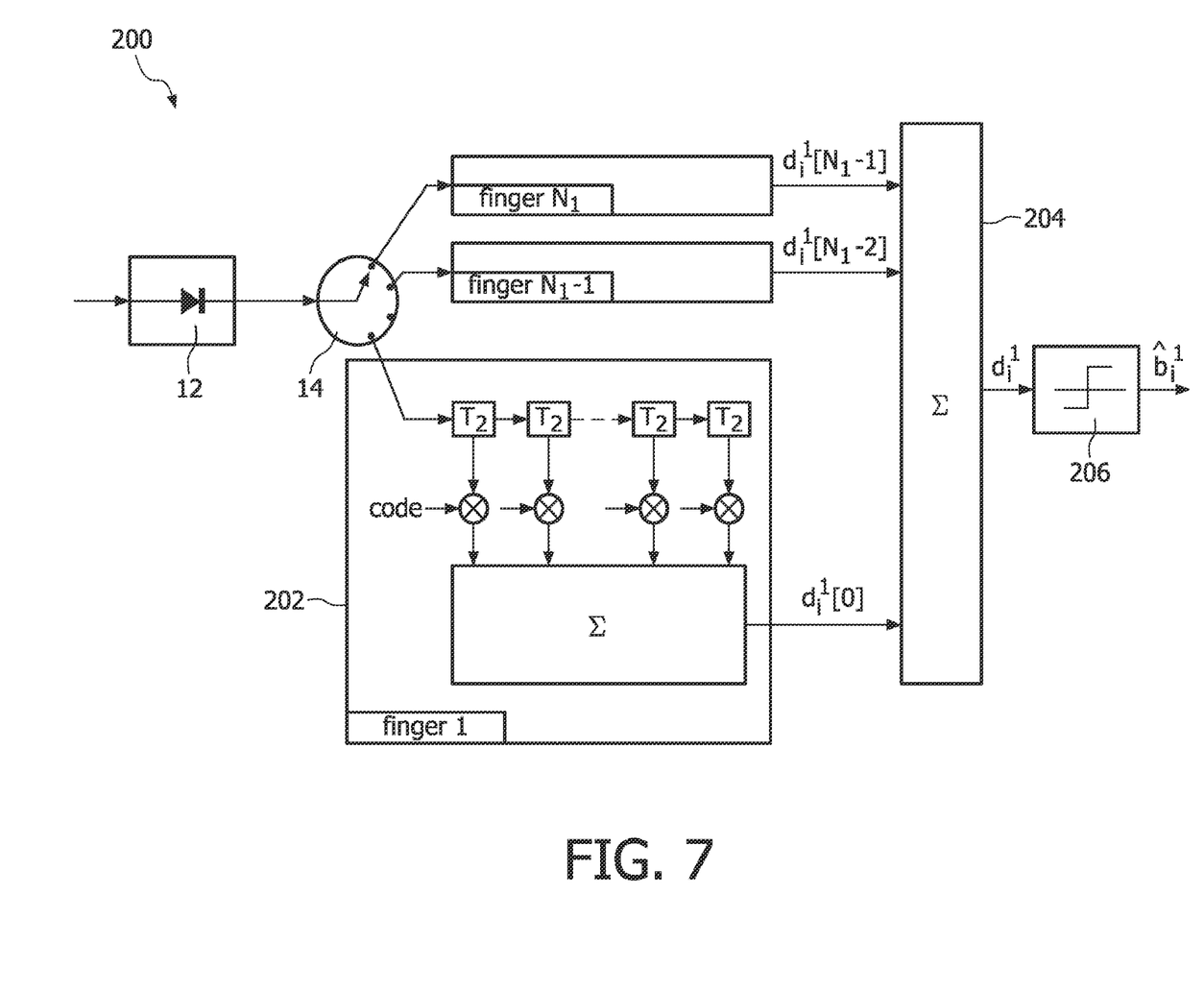
FIG. 7 shows a block diagram of a further receiver to perform correlation operations for the identification of LED CDMA codes in parallel according to the invention.

After the memory is filled with a complete symbol, the receiver 200 then executes a correlation with the code along the relevant columns of the memory. This correlation is performed in block 202 which symbolizes a processing structure for performing the correlation. In mathematical terms, for the n-th column ($n \in \{0, 1, \ldots N_1-1\}$) and the l-th user (assuming that each user has his/her own unique code), it calculates the decision variable for the i-th bit, according to:

$$d_i^l[n] = \frac{2}{N_2} \sum_{j=0}^{N_2-1} c_j^l y^m(iT_3 + jT_2 + nT_1)$$

Here, the sum over j reflects the correlation with all $N_2$ elements of the codes. $c_j^l$ in the above equation gives the known code sequence for user l, while $y^m(iT_3, jT_2+nT_1)$ represents the received electrical signal, sampled at $t=1T_3, jT_2+nT_1$. Note that $2/N_2$ represents just a fixed normalization.

The light channel from a LED to a sensor has two main effects: it attenuates the light and add noise $v(t)$ and interference $\zeta(t)$ from other light sources. $\alpha^{l,m}$ denotes the transfer between LED l and detector m, and includes the effect of the propagation attenuation Further, $\zeta$ denotes the strength of the environmental light.

Inserting this channel model, the following equation is obtained:

$$d_i^l[n] = \frac{2}{N_2} \sum_{j=0}^{N_2-1} c_j^l \left( \sum_{h=0}^{N-1} \alpha^{h,m} s^h(iT_3 + jT_2 + nT_1) + \zeta + v(iT_3 + jT_2 + nT_1) \right)$$

that can also be written:

$$d_i^l[n] = \frac{2}{N_2} \sum_{j=0}^{N_2-1} c_j^l \left( \sum_{h=0}^{N-1} \alpha^{h,m} s^h_{i,j,n} + \zeta^m_{i,j,n} + v_{i,j,n} \right)$$

In the receiver structure 200 of FIG. 7, the result $d_i^l[n]$ is also referred to as the n-th 'finger'. With codes with no DC component, constant environmental light has no effect on the decision variable. Further, with orthogonal codes, no contribution comes from signals different from the l-th one. So, $$d_i^l[n] = \frac{2}{N_2} \sum_{j=0}^{N_2-1} c_j^l(\alpha^{l,m} s_{i,j,n}^l + v_{i,j,n})$$

Inserting the expression for the transmit signal $s_{i,j,n}^l$, the received signal $d_i^l[n]$ becomes:

$$d_i^l[n] = \begin{cases} \frac{2}{N_2} \sum_{j=0}^{N_2-1} c_j^l v_{i,j,n} & \text{for } n = 0, \ldots \tau_i^l - 1 \\ \frac{2}{N_2} \sum_{j=0}^{N_2-1} c_j^l \left( \alpha^{l,m} A_i^l \frac{1-a_{i,j}^l}{2} + v_{i,j,n} \right) & \text{for } n = \tau_i^l, \tau_i^l + 1, \ldots \tau_i^l + k_i^l - 1 \\ \frac{2}{N_2} \sum_{j=0}^{N_2-1} c_j^l v_{i,j,n} & \text{for } n = \tau_i^l + k_i^l, \tau_i^l + k_i^l + 1, \ldots \tau_i^l + w_i^l + \frac{k_i^l}{2} - 1 \\ \frac{2}{N_2} \sum_{j=0}^{N_2-1} c_j^l v_{i,j,n} & \text{for } n = \tau_i^l + w_i^l + \frac{k_i^l}{2}, \tau_i^l + w_i^l + \frac{k_i^l}{2} + 1, \ldots N_1 - 1 \end{cases}$$

In the above formula an explicit multiplication with the code sequence for the signal from each LED is contained. In practice with Walsh Hadamard codes, a full column as depicted in FIG. 6 should be taken to perform a Walsh Hadamard transform using a butterfly structure. This has complexity $N_2$ 2 log $N_2$ operations. Since operations are multiplications by −1 and 1 these further simplify to $N_2$ 2 log $N_2$ additions.

To simplify the expression, noise $\bar{v}_n$, is defined in the n-th finger. As:

$$\bar{v}_n = \frac{2}{N_2} \sum_{j=0}^{N_2-1} c_j^l v_{i,j,n}$$

The variance of this noise is $N_2 \sigma^2$. Moreover, recalling that $\langle C^l, C^l \rangle = N_2$ it is obtained:

$$d_i^l[n] = \begin{cases} \bar{v}_n & \text{for } n = 0, \ldots \tau_i^l - 1 \\ -\alpha^{l,m} A_i^l b_i^l + \bar{v}_n & \text{for } n = \tau_i^l, \tau_i^l + 1, \ldots \tau_i^l + k_i^l - 1 \\ \bar{v}_n & \text{for } n = \tau_i^l + k_i^l, \tau_i^l + k_i^l + 1, \ldots \tau_i^l + w_i^l + \frac{k_i^l}{2} - 1 \\ \bar{v}_n & \text{for } n = \tau_i^l + w_i^l + \frac{k_i^l}{2}, \tau_i^l + w_i^l + \frac{k_i^l}{2} + 1, \ldots N_1 - 1 \end{cases}$$

The main wanted signal from LED/appears to be present at the output of fingers $n = \tau_i^l, \tau_i^l + 1, \ldots \tau_i^l + k_i^l - 1$. It is directly proportional to the product of the current amplitude at the transmitter $A_i^l$ to the path attenuation $\alpha^{l,m}$, and the current symbol $b_i^l$.

In its most generic case, a (linear) combination, i.e., a weighted sum over the decision parameters in block 204 produces the decision variable $d_i^l$, $$d_i^l = \sum_{n=0}^{N_1-1} \zeta_n^l d_i^l[n]$$

where $\zeta^l = [\zeta_0^l, \zeta_1^l, \ldots \zeta_{N1-1}^l]$ represents the vector of weights for the l-th LED.

As seen from the analysis one can detect the signal from one LED by only observing one finger, namely one within $n = \tau_i^l$, $\tau_i^l + 1, \ldots \tau_i^l + k_i^l - 1$ the data from LED/is present, and ignore other decision variables.

The receiver 200 can determine the local illumination from the l-th LED, as $A_i^l \alpha^{l,m} w_i^l$, where the duty cycle $p_i^l = w_i^l N_2$ can locally be known (for example if this value was previously set or because the value is sent with the data by the LED).

Here the local light intensity $A_i^l \alpha^{l,m}$ is estimated as:

$$\text{est}[A_i^l \alpha_i^l] = |d_i^l[0]|$$

The data bit can then be estimated as $$\text{est}[b_i^l] = \text{Sgn}[d_i^l[0]]$$

The invention is suitable to receive a modulated light emission of a lighting device, for example a single LED, multiple LEDs, or a lighting board containing dozens of LEDs, and to identify the light emission of a certain lighting device by detecting a code, particularly a spreading code used for modulation of the light emission. The invention is particularly suitable for receiving and decoding light signals from lighting means containing several lighting devices such as a LED lighting board with dozens, or hundreds of LEDs since the light emission of each lighting device may be detected by the code used for modulating the light emission. The received and decoded light signals may be used for example to control the light emission. A typical example of an application of this technology is a room controller which is adapted to control the lighting of a LED lighting board used in a room by receiving and decoding the light signals emitted from the LED lighting board and to adjust the respective LEDs of the board in accordance with user preferences. Another advantage of the invention is the option to distinguish the light from different light sources by transmitting different codes and/or using different starting positions of the light pulses within a chip period.

At least some of the functionality of the invention such as the inner product calculation may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A receiver for a modulated light signal keyed with a code sequence of a predefined number of chips, the receiver comprising:
   a light sensor for receiving the modulated light signal and converting it into an electrical signal;
   a cyclic sampling means for taking samples of the electrical signal during a plurality of chip periods; and
   processing means for calculating an inner product with the code sequence by using a sequence comprising at least one sample from each chip period.

2. The receiver of claim 1, wherein the processing means are configured to calculate several inner products with the code sequence by using several sequences comprising different samples from each chip period, the receiver further comprising combining means for combining the results of the inner product calculations and generating a decision signal based at least in part on the combination.

3. The receiver of claim 2, wherein the processing means comprise:
   a plurality of inner product calculators for calculating the inner products, and
   switching means for sending different samples from each chip period to different inner product calculators.

4. The receiver of claim 3, wherein at least one inner product calculator of the plurality of inner product calculators comprises a correlator.

5. The receiver of claim 4, wherein at least one inner product calculator of the plurality of inner product calculators is adapted configured to multiply a sample with a value corresponding to the correlator and comprises an accumulator for accumulating and storing multiplication results.

6. The receiver of claim 1, wherein the processing means are adapted to collect all samples to be used for an inner product calculation in a serial-to-parallel buffer in order to form an inner product vector, and execute a matrix operation on the inner product vector.

7. The receiver of claim 6, wherein the matrix operation is a Walsh Hadamard operation on the inner product vector, the matrix operation having a butterfly structure.

8. The receiver of claim 1, wherein the processing means comprise a digital signal processor configured to sequentially store all samples in a memory, and use the stored samples per further inner product calculation in groups representing subsampling.

9. The receiver of claim 8, wherein
   the code sequence comprises N2 chips,
   the cyclic sampling means are adapted to take N1 samples per chip period, and
   the processing means are further adapted to store N1 groups of N2 samples with the same sampling position in a chip period in N1 columns of the memory in order to form inner product vectors for each sampling position, and
   multiply each inner product vector with a matrix containing in each row a code sequence.

10. The receiver of claim 8, wherein
    the code sequence comprises N2 chips,
    the cyclic sampling means adapted to take N1 samples per chip period, and
    the processing means are further configured to store N1 groups of N2 samples with the same sampling position in a chip period in N1 columns of the memory in order to form inner product vectors for each sampling position, and to use each of the N1 inner product vectors as input for a Walsh Hadamard matrix operation of size N2×N2.

11. The receiver of claim 1 configured to receive 2 k results of the inner product calculations for further processing wherein:
    a first set of k results correspond to sampling positions in chip period between an on ramp of a "0" pulse and an on ramp of a "1" pulse, and
    a second set of k results different from the k results of the first set correspond to sampling positions in the chip period between an off ramp of a "0" pulse and an off ramp of a "1" pulse.

12. A method receiving a modulated light signal keyed with a code sequence of a predefined number of chips, the method comprising the steps of:
    receiving the modulated light signal and converting it into an electrical signal;
    taking a plurality of samples of the electrical signal during a plurality of chip periods with a cyclic sampling means, wherein each of said plurality of samples corresponds to one of said plurality of chip periods; and
    calculating an inner product with the code sequence by using a sequence that contains one sample from each chip period.

13. The method of claim 12, further comprising the steps of:
    calculating several inner products with the code sequence by using several sequences that contain different samples from each chip period, and
    combining the results of the inner product calculations and generating a decision signal based at least in part on the combination.

14. The method of claim 13, wherein the inner product calculation comprises the steps of multiplying a received sample with a value corresponding to the associated chip and accumulating and storing the multiplication results.

15. A system configured to perform a method according to claim 12, the system comprising
    a sensor for receiving modulated light signal keyed with a code sequence of a predefined number of chips and converting the received light signal into an electrical signal, and
    the cyclic sampling means taking a subset of the samples of the electrical signal during a number of chip period for further processing.

16. A system for receiving a modulated light signal and processing the received light signal, the system comprising
    a light sensing device comprising communication means for sending light measurements to a light signal processing device configured to process the received light measurements according to the method of claim 12.

17. The system of claim 16, wherein the light sensing device is a handheld device and the light signal processing device is a computer programmed to perform a method according to claim 12 and comprises a means for taking several subsets of samples of the electrical signal during a sequence of chip period for further processing, including the calculation of inner products.

18. A receiver for a modulated light signal keyed with a code sequence of a predefined number of chips, the receiver comprising:
    a light sensor for receiving the modulated light signal and converting it into an electrical signal,
    a cyclic sampling means for taking samples of the electrical signal during a plurality of chip periods, and
    processing means for calculating an inner product with the code sequence by using a sequence comprising at least one sample from each chip period,
    wherein the processing means comprise a digital signal processor configured to sequentially store all samples in a memory, and use the stored samples per further inner product calculation in groups representing subsampling, and
    wherein the receiver is configured to receive 2 k results of the inner product calculations for further processing wherein:
    a first set of k results correspond to sampling positions in chip period between an on ramp of a "0" pulse and an on ramp of a "1" pulse, and
    a second set of k results different from the k results of the first set correspond to sampling positions in the chip period between an off ramp of a "0" pulse and an off ramp of a "1" pulse.

\* \* \* \* \*